United States Patent Office 2,999,479
Patented Sept. 12, 1961

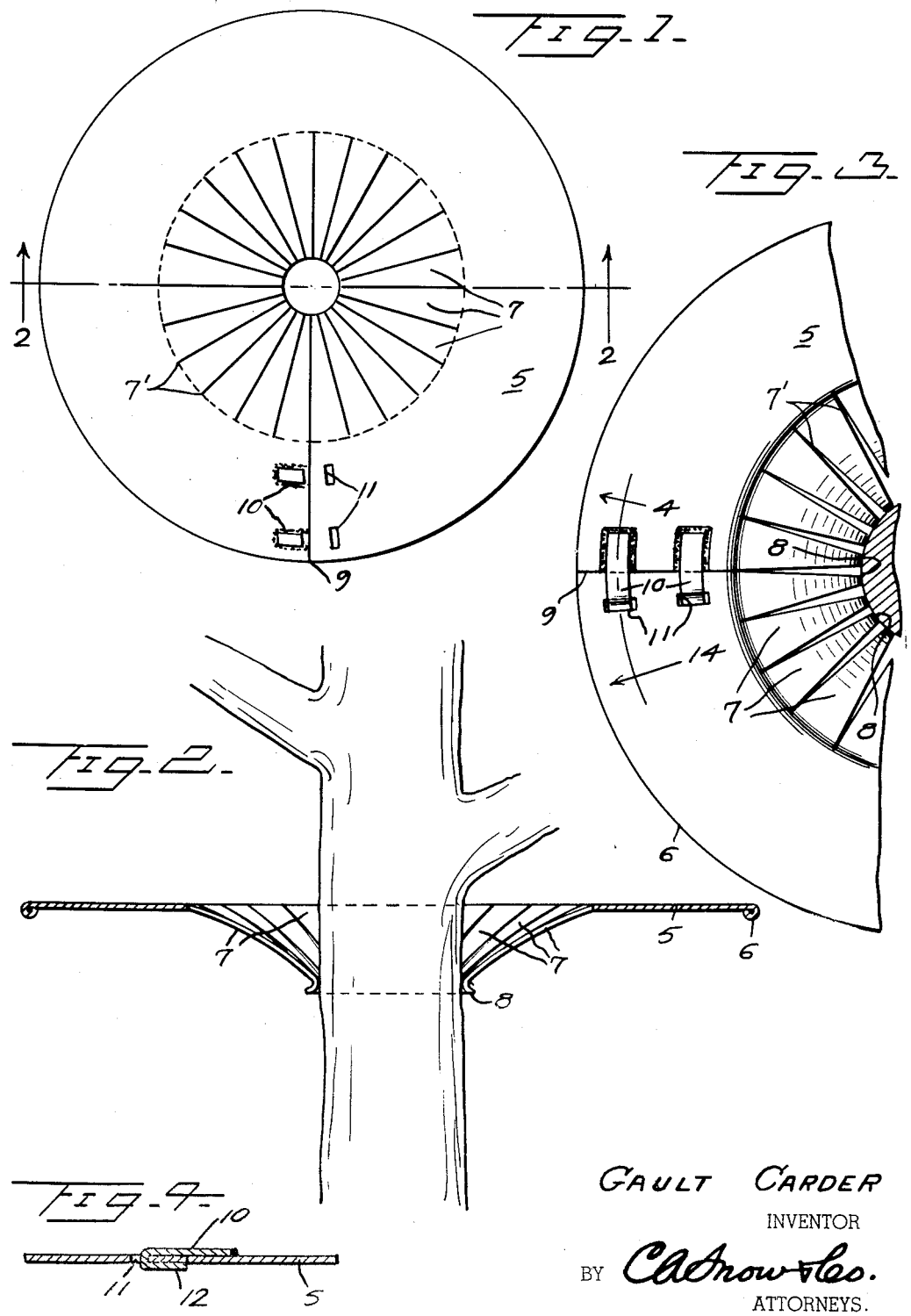

2,999,479
ANIMAL RESTRAINING TREE GUARD
Gault Carder, Box 41, Gassaway, W. Va.
Filed Feb. 17, 1960, Ser. No. 9,358
1 Claim. (Cl. 119—1)

The present application is a continuation in part of my copending application Serial Number 790,296, now abandoned, entitled Bird Saving Device, filed January 30, 1959.

This invention embodies a guard designed for positioning around the trunk of a tree, the guard being so constructed and arranged that it will act as a barrier against reptiles or tree climbing animals from disturbing the birds' nests in which eggs or young birds are contained.

An important object of the invention is to provide a guard of this character which may be readily and easily positioned around the trunk or limb of a tree, the construction of the guard being such that it will automatically adjust itself on the tree trunk or limbs of trees of various diameters.

A still further object of the invention is to provide a guard having a plurality of tree gripping fingers for frictionally gripping and holding the guard in its positions of adjustment.

Another important object of the invention is to provide spring fingers wherein the free ends thereof are curved outwardly, presenting smooth trunk engaging ends so that the guard may be readily adjusted longitudinally of the tree trunk or limb by merely forcing the same longitudinally of the tree trunk.

Still other objects reside in the combinations of elements, arrangements of parts, and features of construction, all as will be more fully pointed out hereinafter and shown in the accompanying drawings, wherein there is disclosed a preferred embodiment of this inventive concept.

Referring to the drawing:

FIGURE 1 is a bottom plan view of a guard, constructed in accordance with the invention.

FIGURE 2 is a sectional view taken on line 2—2 of of FIGURE 1.

FIGURE 3 is a fragmental plan view of the guard.

FIGURE 4 is a fragmental sectional view taken on line 4—4 of FIGURE 3.

Referring to the drawing in detail, the guard comprises a disk-like body portion indicated generally by the reference character 5, the periphery of the disk or body portion 5 being turned downwardly as at 6 lending rigidity to the body portion to prevent the same from becoming distorted under wind pressure.

The central portion of the disk-like body has a plurality of radial slits 7' which form a plurality of elongated yieldable fingers 7, which fingers are tapered inwardly towards the free ends thereof, the free ends of the fingers being turned laterally as at 8, where they present smooth surfaces to allow the body portion to be slid longitudinally of the trunk or limb of the tree on which the guard is positioned.

The body portion is split as at 9, the split portion of the body being brought together and held by means of tongues 10, the tongue being welded at one of their respective ends, to the upper surface of the body portion 5 the free ends of the tongues passing downwardly through openings 11 formed in the opposite side of the split portion, where the tongues are bent rearwardly at 12 securely locking the tongues within the openings and at the same time securing the disk-like body portion or split sections around a tree trunk.

As shown by FIGURE 2 of the drawing, the fingers 7 are of such lengths that the free ends thereof are disposed substantial distances from the point of mergence with the body portion, with the result that a wide range of bending is permitted when the body portion is positioned around a tree trunk, thereby affording means for automatically adjusting itself with respect to the tree trunk where the guard is held in position by frictional contact of the free ends of the fingers with respect to the tree trunk.

In view of the construction of applicant's guard, it will be obvious that these guards may be stored flat and readily brought into use when it is desired to mount a guard on a tree limb or branch, the fingers automatically assuming their proper gripping relation with the trunk of the tree.

In view of the fact that the free ends of the tongues are curved laterally, it will be obvious that the ends of the fingers will not pierce the tree trunk and prevent the adjustment as claimed.

It will of course be understood that the body portion may be constructed of sheet metal, or suitable plastic material so that when the tongues are cut from the material, they will have sufficient flexibility to cause them to grip the trunk or limb of the tree around which the guard is positioned holding the disk-like body portion in place, without the necessity of using screws, nails or other securing means.

In order to position the guard, it is only necessary to open the guard at the split portion and position it around the trunk or limb of a tree to be guarded, the tongues 10 being positioned within the openings of the adjacent end of the split portion of the body, securing the body portion around the tree.

As previously stated, the fingers 7 will now grip the trunk or limb of the tree and hold the guard against accidental displacement caused by wind pressure or contact with an animal or reptile attempting to move around the guard to attack the small birds or eggs contained in a nest above the guard.

From the foregoing it is believed that the construction and operation of applicant's guard will be obvious and that a further description of the guard is unnecessary.

Having thus described the invention, what I claim is:

An animal restraining tree guard comprising a disc-like body having a substantially circulen periphery, said body having radial slits extending inwardly from points spaced inwardly from said periphery, said slits forming fingers which terminate at a central portion of said body, the terminal ends of said fingers being curved out of plane of said body, one of said slits extending through the periphery of said body, and releasable interlocking means on said body on opposite sides of said slit which extends through the periphery of said body, whereby said guard may be opened to pass about the trunk of a tree and then by bending the fingers as they engage the tree trunk enable the guard to be locked about the said tree trunk.

References Cited in the file of this patent
UNITED STATES PATENTS 2,499,552   White _____ Mar. 7, 1950

FOREIGN PATENTS 20,799    Great Britain _____ Apr. 27, 1911
705,090   Great Britain _____ Mar. 10, 1954